United States Patent
Nemoto et al.

(10) Patent No.: US 8,508,523 B2
(45) Date of Patent: Aug. 13, 2013

(54) INFORMATION DISPLAY DEVICE, INFORMATION DISPLAYING METHOD, AND COMPUTER PROGRAM PRODUCT

(75) Inventors: Eiji Nemoto, Tokyo (JP); Hiroki Ohkubo, Kanagawa (JP); Yuji Matsuda, Tokyo (JP); Yusuke Ozaki, Tokyo (JP); Hiroyuki Takahashi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1214 days.

(21) Appl. No.: 12/106,645

(22) Filed: Apr. 21, 2008

(65) Prior Publication Data

US 2008/0259071 A1 Oct. 23, 2008

(30) Foreign Application Priority Data

Apr. 23, 2007 (JP) ................................. 2007-113281
Feb. 29, 2008 (JP) ................................. 2008-050960

(51) Int. Cl.
*G06F 3/038* (2006.01)
(52) U.S. Cl.
USPC ........... 345/212; 345/211; 345/173; 345/168; 345/107; 340/5.82; 340/5.83; 382/126; 382/313; 382/315; 715/320; 715/340
(58) Field of Classification Search
USPC ........ 345/212, 211, 173, 168, 107; 340/5.82, 340/5.83; 382/126–127, 313–315; 715/320, 715/340
See application file for complete search history.

(56) References Cited

U.S. PATENT DOCUMENTS

| 5,598,279 | A | 1/1997 | Ishii et al. |
| 2002/0080132 | A1* | 6/2002 | Dai et al. ...................... 345/212 |
| 2004/0208345 | A1* | 10/2004 | Chou et al. .................... 382/124 |
| 2006/0177212 | A1* | 8/2006 | Lamborghini et al. ....... 396/287 |
| 2006/0285867 | A1 | 12/2006 | Takahashi et al. |

FOREIGN PATENT DOCUMENTS

| JP | 2004-165978 | 6/2004 |
| JP | 2004-317700 | 11/2004 |
| JP | 2004-350439 | 12/2004 |
| JP | 2006-23617 | 1/2006 |
| JP | 2006-39708 | 2/2006 |
| JP | 2006-59138 | 3/2006 |
| WO | WO 02/03367 | 1/2002 |

* cited by examiner

*Primary Examiner* — Lun-Yi Lao
*Assistant Examiner* — Shaheda Abdin
(74) *Attorney, Agent, or Firm* — Oblon, Spivak, McClelland, Maier & Neustadt, L.L.P.

(57) ABSTRACT

A display control unit performs a control of displaying first image information on a display unit. An electric-power supply unit converts thermal energy generated from a body temperature of a user into electric power upon the user contacting the electric-power supply unit, and supplies the electric power to the display control unit. A determination unit determines whether the user is in contact with the electric-power supply unit. When it is determined that the user is not in contact with the electric-power supply unit, the display control unit performs a control of rewriting the first image information displayed on the display unit with second image information.

13 Claims, 7 Drawing Sheets

INFORMATION DISPLAY DEVICE, INFORMATION DISPLAYING METHOD, AND COMPUTER PROGRAM PRODUCT

CROSS-REFERENCE TO RELATED APPLICATIONS

The present application claims priority to and incorporates by reference the entire contents of Japanese priority documents, 2007-113281 filed in Japan on Apr. 23, 2007 and 2008-050960 filed in Japan on Feb. 29, 2008.

BACKGROUND OF THE INVENTION

1. Field of the Invention

The present invention relates to a technology for displaying information by supplying electric power converted by using thermoelectric transduction.

2. Description of the Related Art

Recently, an information display apparatus as a substitute for paper or an electronic device, such as electronic paper, has become a subject of attention. Electronic paper is a display device that is formed in thickness of a few tenth of a millimeter, and capable to display and to delete data thereon through an electrical process, and can be carried by a user while retaining information thereon similarly to paper. Moreover, because electronic paper consumes electric power only when changing screen contents, the electronic paper can maintain a state that image data is displayed thereon even after the power is turned off, thereby drastically reducing power consumption.

When rewriting screen data or deleting image data, electronic paper requires electric power as described above, so that the electronic paper is supplied with electric power by installing thereon a battery or being connected to an external power source.

In addition to a battery, electronic paper using a solar cell as a power supply source is proposed. For example, Japanese Patent Application Laid-open No. 2004-317700 discloses an example of electronic paper equipped with a transparent solar cell instead of a battery.

However, after image data is once displayed on electronic paper, if a battery becomes exhausted or a connection to an external power source is canceled, electric power is not supplied to the electronic paper, consequently, the electronic paper is mechanically to maintain a state that the image data is displayed thereon. When display of the image data is maintained in this way, there is a possibility that someone around the user may easily peep at the image data displayed on the electronic paper, therefore, the electronic paper cannot deal with confidential information, and has to limit contents of information to be displayed. It is also difficult to limit display of image data only to a user who is involved in confidential information.

To ensure the confidentiality of image data displayed on electronic paper, it needs to rewrite or delete the displayed image data by supplying electric power to the electronic paper. However, if a battery is installed on electronic paper, work of charging the battery is required, or if an external power source is connected to the electronic paper, work of connecting the external power source is required, any of which is inconvenient. Moreover, if a battery is installed on electronic paper, the electronic paper becomes heavier and larger, resulting in a problem of poor portability. Furthermore, when frequently rewriting image data, electronic paper has to be equipped with a battery having a capacity adequate for rewriting image data, as a result, if an installed battery becomes large, the electronic paper becomes larger, so that its portability becomes poorer.

Electronic paper equipped with a transparent solar cell as disclosed in the patent document No. 2004-317700 tends to be affected by environmental conditions, so that when using it indoors or at night, electric power cannot be supplied, resulting in a poor convenience.

SUMMARY OF THE INVENTION

It is an object of the present invention to at least partially solve the problems in the conventional technology.

According to an aspect of the present invention, there is provided an information display apparatus including a display unit that displays thereon first image information; a display control unit that performs a control of displaying the first image information on the display unit; an electric-power supply unit that converts thermal energy generated from a body temperature of a user into electric power upon the user contacting the electric-power supply unit, and supplies the electric power to the display control unit; and a determination unit that determines whether the user is in contact with the electric-power supply unit. When the determination unit determines that the user is not in contact with the electric-power supply unit, the display control unit performs a control of rewriting the first image information displayed on the display unit with second image information.

Furthermore, according to another aspect of the present invention, there is provided a method of displaying information executed in an information display apparatus that includes a display unit that displays thereon first image information and an electric-power supply unit that converts thermal energy generated from a body temperature of a user into electric power upon the user contacting the electric-power supply unit, and supplies the electric power to a display control unit. The method includes display controlling including the display control unit performing a control of displaying the first image information on the display unit; determining whether the user is in contact with the electric-power supply unit; and performing a control of rewriting the first image information displayed on the display unit with second image information when the determining includes determining that the user is not in contact with the electric-power supply unit.

Moreover, according to still another aspect of the present invention, there is provided a computer program product comprising a computer-usable medium having computer-readable program codes embodied in the medium that when executed cause a computer to execute display controlling including a display control unit performing a control of displaying first image information on a display unit; determining whether a user is in contact with an electric-power supply unit that converts thermal energy generated from a body temperature of the user into electric power upon the user contacting the electric-power supply unit, and supplies the electric power to the display control unit; and performing a control of rewriting the first image information displayed on the display unit with second image information when the determining includes determining that the user is not in contact with the electric-power supply unit.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention will be explained below in detail with reference to the accompanying drawings. The following embodiments are described in examples where an information display apparatus according to an embodiment of the present invention is applied to electronic paper. The following embodiments are examples for implementing the information display apparatus according to the present invention, so that configurations and operations of the embodiments can be modified, and such modifications can be implemented within a scope not departing from a concept of the present invention.

An information display apparatus according to an embodiment of the present invention includes an electric-power supply unit that uses a thermoelectric device. Accordingly, electric power can be supplied to electronic paper without electric power supply from a power source, a battery, or an external power source, and without influence of a use environment, so that convenience and portability for a user are improved.

According to another embodiment of the present invention, the electric-power supply unit including the thermoelectric device can be configured to use a body temperature of a user, to generate electric power with the use of a difference between the body temperature and an ambient temperature by arranging a thermal conductor to come into contact with a hot junction of the thermoelectric device to conduct heat generated from a human body, and arranging a heat sink isolated from the outside and having reduced temperature variations to come into contact with a cold junction of the thermoelectric device, and to use energy of the generated electric power as operating power of electronic paper. Accordingly, when performing a control operation that requires electric power, such as rewriting of screen display of the electronic paper, the user can supply the required electric power to the electronic paper on a semipermanent basis without electric power supply from a battery or an external power source.

Additionally to the above configurations, the information display apparatus can include a switch of giving an instruction to rewrite image data displayed on the electronic paper by using electric power from the electric-power supply unit.

Moreover, the information display apparatus can include a switch of giving an instruction to rewrite memory data of the electronic paper by using electric power from the electric-power supply unit.

Furthermore, the information display apparatus can include a function of indicating to the user whether electric power to be required for a control operation, such as rewriting of image data, can be supplied by thermoelectric generation or a charger.

According to the thermoelectric generation by using a body temperature of the user in the above embodiments, the thermoelectric generation is performed through an action of holding the electronic paper by the user. Therefore, electric power generation and supply are sometimes too late for an image data operation immediately after the user holds the electronic paper in some cases. In a case of another electronic paper including a battery as well as a thermoelectric generator, the battery may be sometimes exhausted in some cases. To avoid such situation, the information display apparatus can be configured to indicate availability of an operation to the user.

Moreover, the information display apparatus can include an operational switch of changing or scrolling image data displayed on the electronic paper by using electric power from the electric-power supply unit.

Furthermore, the information display apparatus can be configured to secure operating power by thermoelectric generation.

Moreover, the information display apparatus can include a switch of rewriting and displaying image data to be displayed in accordance with an instruction from a user, thereby improving the confidentiality of information.

Furthermore, the information display apparatus can be configured such that operational switches are provided separately for respective functions to distribute units that generates heat in thermoelectric generation performed in the electronic paper with the use of a body temperature of the user of the electronic paper. Moreover, thermoelectric efficiency of the thermoelectric generation can be improved by performing operational control with an operational button arranged at a fixed position by distinguishing each of control operational functions from the others based on actions of the operational button, such as a count of ON/OFF actions, a period of ON, intervals of the actions.

Furthermore, the information display apparatus can be configured such that the electric-power supply unit that is touched by a user determines acceptability of data inquiry from the user by performing fingerprint authentication. Precisely, as a sensor for performing fingerprint authentication is arranged at a part configured to be touched by a user and to perform thermoelectric generation with the use of a body temperature of the user, rewriting of image data on the electronic paper can be approved by checking registered fingerprint data, so that the confidentiality of image data is improved. Similarly, a system using verification with a personal identification number, such as a user code, is also conceivable. It is conceivable to deliver information in a magazine or a newspaper as electronic data only to registered users. It is feasible that the electronic paper that is not held by the user rewrites image data after a lapse of a predetermined period, and prevents the image data from being seen by someone other than the user. The information display apparatus can be configured to include selectable modes from which the user can select a transit operation for a transition after a lapse of a predetermined period.

Moreover, the information display apparatus can include a charging unit that stores therein electric power converted by the thermoelectric device, and a power-source switching circuit. Accordingly, when supply of a large amount of electric power is required, for example, when the screen is continuously scrolled, a large amount of electric power can be supplied from the charging unit.

Electronic paper according to a first embodiment of the present invention is explained below with reference to FIG. 1.

Figure 1:
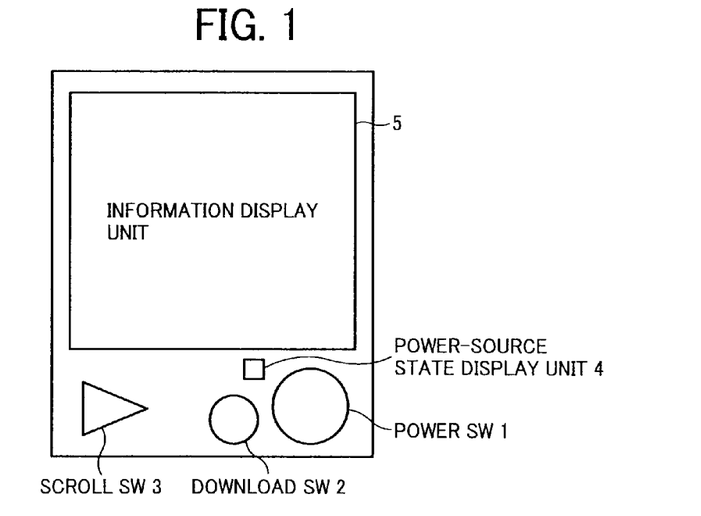
FIG. 1 is a schematic diagram of an appearance of electronic paper as an example of an external configuration according to a first embodiment of the present invention.

As shown in FIG. 1, the electronic paper includes a power SW 1, a download SW 2, a scroll SW 3, a power-source state display unit 4, and an information display unit 5.

The power SW 1 is to be pressed by a user when starting to collect information. Moreover, the power SW 1 is to be pressed by the user when receiving an operation of switching-on or switching-off the power of the electronic paper from the user.

The download SW 2 is to be pressed by the user when receiving an operation of acquiring image data to be displayed from an external device or other devices by downloading or another operation.

The scroll SW 3 is to be pressed by the user when receiving an instruction to rewrite image data to be displayed on the electronic paper.

The power-source state display unit 4 displays a thermoelectric generation level when converting thermal energy generated from a body temperature of the user into electric power, and indicates availability of operational control, such as rewriting of image data on the electronic paper.

The information display unit 5 is a display device that can display thereon information, such as image data, and can maintain a display state of the image data even when supply of electric power is stopped after the image data is once displayed.

Figure 2:
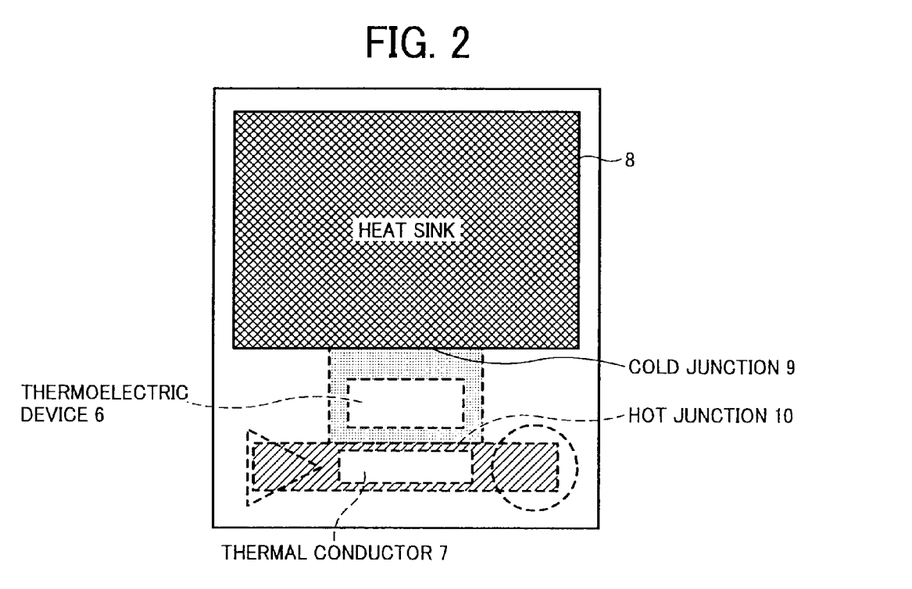
FIG. 2 is a schematic diagram of an example of an internal configuration of the electronic paper shown in FIG. 1.

An internal configuration of the electronic paper is explained below in detail with reference to FIG. 2.

A thermoelectric generation unit 11 as an electric-power supply unit (see FIG. 3) includes a thermoelectric device 6, a thermal conductor 7, and a heat sink 8. The thermoelectric device 6 includes a number of thermocouples that are arranged therein, and works by using the Seebeck effect. The thermal conductor 7 is for electric-power generation and in contact with the thermoelectric device 6 via a hot junction 10. The heat sink 8 is in contact with the thermoelectric device 6 via a cold junction 9. The thermoelectric generation unit 11 supplies electric power from the thermoelectric device 6 to a control unit 100 of the electronic paper.

The power SW 1, the download SW 2, and the scroll SW 3 are arranged to be superposed on a position at which the thermal conductor 7 is arranged, and connected to the thermal conductor 7. Accordingly, the thermal conductor 7 is configured to conduct a body temperature to the thermoelectric device 6 by efficiently conducting body heat generated from the user when the user is in contact with a key top of at least one of the switches to the hot junction 10 of the thermoelectric device 6.

The heat sink 8 is arranged on the backside of the information display unit 5 (see FIG. 1), configured to increase heat dissipation by being arranged over a wide area, and to conduct thermally stably a low temperature close to an ambient temperature to the cold junction 9 of the thermoelectric device 6, thereby conducting the low temperature to the thermoelectric device 6.

The thermoelectric device 6 converts thermal energy generated from a temperature difference between the body heat from the user and the ambient temperature into electric power, and supplies the converted electric power to the control unit 100 of the electronic paper.

A configuration, operations, and control of the electronic paper according to the first embodiment are explained below with reference to FIG. 3.

Figure 3:
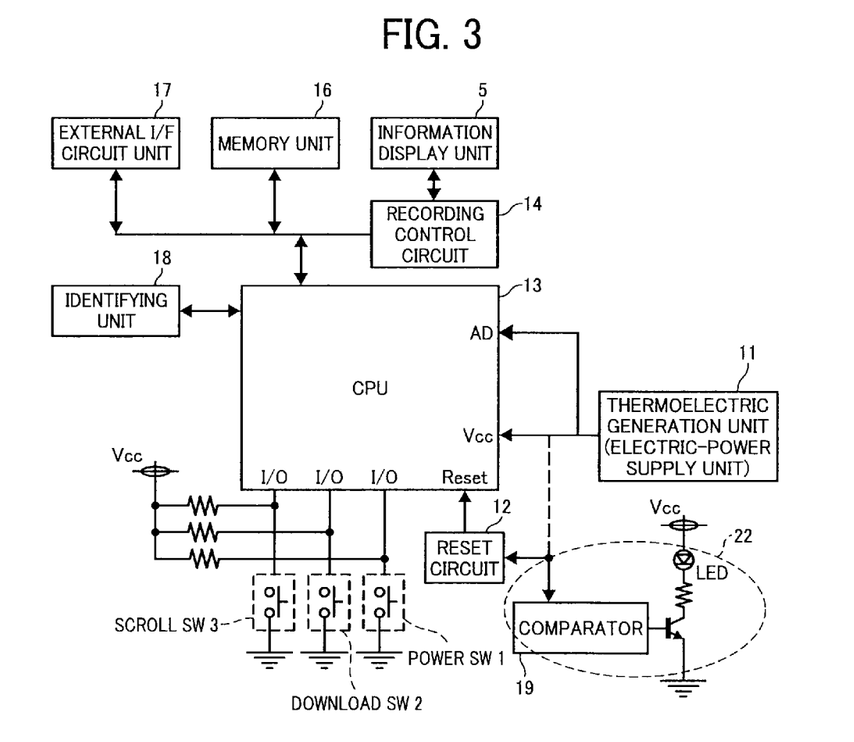
FIG. 3 is a schematic diagram of an example of a hardware configuration of the electronic paper shown in FIG. 1.

As shown in FIG. 3, the electronic paper includes the thermoelectric generation unit (electric-power supply unit) 11, a reset circuit 12, a central processing unit (CPU) 13, a recording control circuit 14, the information display unit 5, a memory unit 16, an external interface (I/F) circuit unit 17, an identifying unit 18, a comparator 19, the power SW 1, the download SW 2, the scroll SW 3, and a voltage display unit 22.

When thermal energy generated from a body temperature of the user is converted into electric power through contact with the user, the electric-power supply unit 11 supplies the converted electric power to the control unit 100.

According to the first embodiment, the electronic paper includes the electric-power supply unit that uses thermoelectric generation, and can be supplied with electric power without electric power supply from a battery or an external power source, and without influence of a use environment, thereby improving convenience and portability of the electronic paper.

Moreover, because the electronic paper can gain operating power by thermoelectric generation with body heat conducted from the user's hand that holds the electronic paper when the user uses it, the electronic paper can be supplied with required electric power when a control operation occurs, such as rewriting of screen display of the electronic paper, on a semipermanent basis without electric power supply from a battery or an external power source, thereby improving convenience and portability for the user.

When electric power is supplied, if a voltage higher than a predetermined level is detected, the reset circuit 12 performs a reset operation, and an initial reset operation is performed in the control unit 100, so that operation of the control unit 100 of the electronic paper is ready for start.

The power SW 1 is arranged at a position at which the user can easily press it with a finger while holding the electronic paper, and configured such that an input port of the CPU 13 recognizes a key input onto the power SW 1. When recognizing that the power SW 1 is pressed, the CPU 13 performs an operation of rewriting image data displayed on the electronic paper.

The memory unit 16 is a recording medium that stores therein image data to be displayed on the information display unit 5. The image data includes, for example, confidential image data and other image data that is not confidential.

The recording control circuit 14 acquires image data to be displayed from the memory unit 16 in accordance with a command from the CPU 13, and performs control of rewriting image data displayed on the information display unit 5.

As the electronic paper includes a switch for the user to give an instruction to rewrite image data to be displayed on the electronic paper by using electric power from the electric-power supply unit 11, the user can rewrite and display image data by giving an operational instruction to read image data, so that a peep at the displayed image data easily by someone around the user can be prevented.

Electronic paper can maintain a state that image data is displayed thereon without electric power supply, on the other hand, it requires electric power supply to rewrite displayed image data.

For this reason, it is difficult for conventional electronic paper to achieve both ensuring the confidentiality of information and saving electric power. By contrast, the electronic paper according to the first embodiment is configured such that the CPU 13 can recognize an operation onto the download SW 2 with an input port to the download SW 2. The download SW 2 performs acquisition and renewal of image data to the memory unit 16 via the external I/F circuit unit 17 with the CPU 13.

As the electronic paper includes a new switch for the user to give an instruction to rewrite memory data of the electronic paper by using electric power from the electric-power supply unit 11, the user can easily rewrite image data by operating the new switch of giving an instruction to renew memory without connecting to a battery or an external power source to acquire image data.

The external I/F circuit unit 17 performs an operation of reading image data through wire via an interface connector, and furthermore, the use of the external I/F circuit unit 17 through communication via wireless transmission, which is used, for example, in radio frequency identification, is also conceivable. The scroll SW 3 is configured such that the CPU 13 can recognize an operation onto the scroll SW 3 with an input port to the scroll SW 3.

The CPU 13 renews displayed image data by issuing a command to the recording control circuit 14, acquiring image data from the memory unit 16, and performing control of rewriting image data displayed on the information display unit 5.

As the electronic paper includes the scroll SW 3 that changes or scrolls image data displayed on the electronic paper by using electric power from the electric-power supply unit 11, image data can be rewritten in accordance with an instruction from the user.

Actions on the switches and operations led by the actions are explained below. For example, control units each of which is operated by using an input signal created by an action of pressing a switch can be integrated and the number of switches can be reduced by distinguishing each of control instructions from the others in accordance with a count and timing of pressing a single switch.

For example, the CPU 13 acquires input signal levels of the single switch by sampling, and counts ON/OFF actions for a predetermined period.

Based on the count of ON/OFF actions, an operational control function is distinguished from the others, so that integration of switches can be achieved. Thus, as the switches are integrated, the user is touching the single switch at one position for a longer time, consequently, electric power generated by thermoelectric generation can be more stably supplied.

Thermoelectric efficiency of thermoelectric generation by using a body temperature of the user can be improved by performing operational control with an operational button arranged at a fixed position by distinguishing each of control operational functions from the others based on actions of the operational button, such as a count of ON/OFF actions, a period of ON, and intervals of the actions, so that convenience of the electronic paper can be improved.

The comparator 19 shown in FIG. 3 compares a voltage value of electric power generated by the electric-power supply unit 11 with a voltage value adequate for a control operation, i.e., a threshold. A light emitting diode (LED) indicates a power level whether the voltage is adequate for a control operation by lighting. Although an LED is provided for indicating the power level in the first embodiment, a plurality of LEDs can be provided, and each of the LEDs can be configured to light up or out with respect to each of operations.

Because the electric-power supply unit 11 using thermoelectric generation generates electric power with body heat (a body temperature) conducted through contact with the user, a time delay of electromotive generation is concerned due to environmental conditions.

For this reason, an indicating unit for a thermoelectric generation level is provided, and indicates availability of operations of operational control to the user, thereby improving convenience. In addition to the indicator of the LED, a presentation of the voltage by using the information display unit 5 is also conceivable.

As the electronic paper include a function of indicating to the user whether electric power to be required for a control operation, such as rewriting of image data, can be supplied by thermoelectric generation, the electronic paper can indicate to the user whether an operation, such as rewriting of image data, is available, thereby improving its convenience.

The identifying unit 18 that is provided on a part where a user can touch, for example, the electric-power supply unit 11, acquires identification information about a user who touches the electric-power supply unit 11, and outputs the acquired identification information to the CPU 13. The CPU 13 then determines whether to disclose image data by recognizing the identification information, thereby further ensuring the confidentiality of information, such as image data to be displayed on the information display unit 5 of the electronic paper.

A fingerprint or a palm pattern of which information can be acquired simultaneously as a user holds the electronic paper, a quick response (QR) code, a personal identification code, a user code, or the like, can be used as identification information.

As the electric-power supply unit 11 that is touched by a user can perform user authentication through fingerprint authentication, the electronic paper can rewrite image data thereon in accordance with verification of a fingerprint of the user against registered fingerprint data, thereby improving the confidentiality of image data.

A system using verification with a personal identification number, such as a user code, is also conceivable. It is conceivable to deliver information in a magazine or a newspaper as electronic data only to registered users.

On the other hand, to protect confidential information displayed by the user, if the user leaves the electronic paper alone without holding it with a hand, the electronic paper can ensure the confidentiality of image data by counting time with a timer of the CPU 13, and then rewriting displayed image data after a lapse of a predetermined period.

One of methods of detecting whether the user is holding the electronic paper is, for example, detection of a voltage value of the electric-power supply unit 11. According to the method, when the user is not holding the electronic paper, decrease in the voltage value can be assumed.

An analog port of the CPU 13 is a port into which the voltage value is input. The comparator 19 compares the input voltage with a threshold, and then a determination unit 101 determines whether the user is not holding the electronic paper based on whether a voltage in a predetermined period falls below the threshold, the determination unit 101 being implemented by the CPU 13 as described later.

The recording control circuit 14 then acquires image data to be displayed from the memory unit 16 in accordance with a command from the CPU 13, and renews displayed image data by performing control of rewriting image data to the information display unit 5, thereby ensuring the confidentiality.

In addition to the method of rewriting image data based on a lapse of a predetermined period, it is conceivable to rewrite displayed image data immediately upon detection of decrease in the voltage of the electric-power supply unit 11.

As the electronic paper includes a function of deleing or rewriting image data after a lapse of a predetermined period in a state that the user is not in contact with the electric-power supply unit 11, the electronic paper can prevent image data from being seen by someone other than the user who is permitted to access to the image data.

However, the user sometimes confirms displayed image data by placing the electronic paper on a desk without touching it in some cases depending on a way of use, therefore it is inconvenient that the electronic paper rewrites displayed image data after a lapse of a predetermined period without exception.

To avoid such situation, the electronic paper can be configured to include a transit switch for setting an off-image mode that allows a user to select whether to rewrite displayed image data when the electronic paper is left alone, i.e., when the user is not in contact with the electric-power supply unit 11, and to perform control of not-rewriting displayed image data by recognizing an input from the transit switch with the CPU 13.

An input port of the CPU 13 recognizes a command not to rewrite image data in accordance with a way of operating the transit switch by the user. As a result, the electronic paper is switched into a mode that the electronic paper does not rewrite image data even under a decreased voltage.

In this way, the electronic paper can be configured to be selectable whether to transit to the operation of rewriting image data after a lapse of a predetermined period in a state that the user is not in contact with the electric-power supply unit 11, thereby improving its convenience.

Figure 4:
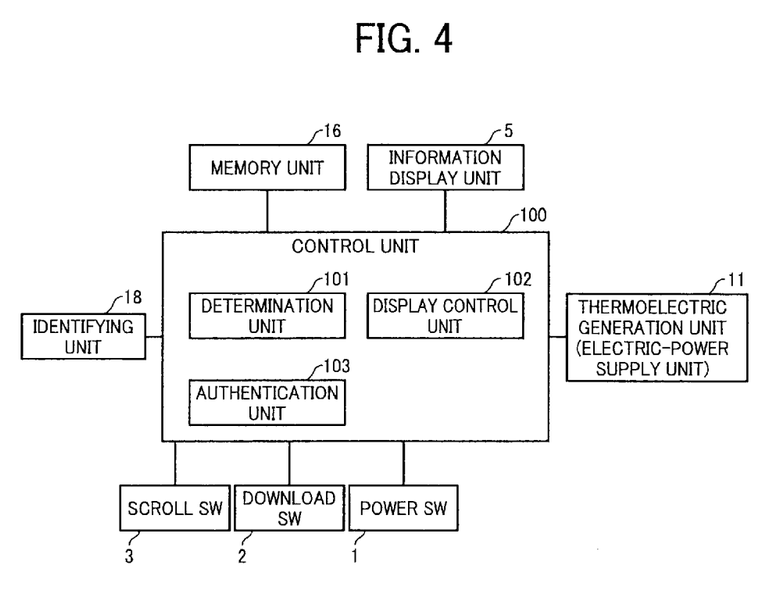
FIG. 4 is a functional block diagram of an example of a configuration of the electronic paper shown in FIG. 1.

As shown in FIG. 4, the control unit 100 of the electronic paper according to the first embodiment mainly includes the determination unit 101, a display control unit 102, and an authentication unit 103, and is connected to the electric-power supply unit 11, the information display unit 5, the memory unit 16, the identifying unit 18, the power SW 1, the download SW 2, and the scroll SW 3. The power SW 1, the download SW 2, the scroll SW 3, the memory unit 16, and the information display unit 5 are already described above, therefore explanations of them are omitted. The determination unit 101, the display control unit 102, and the authentication unit 103 are configured to function as the CPU 13 executes an information display program stored in a read-only memory (ROM) or another device.

The determination unit 101 determines whether the user is in contact with the electric-power supply unit 11. Specifically, when a voltage of the electric-power supply unit 11 is lower than a threshold, the determination unit 101 determines that the user is not in contact with any switch, precisely, not in contact with the electric-power supply unit 11. By contrast, when the voltage of the electric-power supply unit 11 is not lower than the threshold, the determination unit 101 determines that the user is in contact with at least one of the switches, precisely, in contact with the electric-power supply unit 11.

The display control unit 102 performs control of displaying image data stored in the memory unit 16 onto the information display unit 5, and control of rewriting image data to another image data stored in the memory unit 16 and displaying the rewritten image data. According to the first embodiment, when the determination unit 101 determines that the user is not in contact with the electric-power supply unit 11, the display control unit 102 performs control of reading another image data that is not confidential from the memory unit 16, then rewriting image data displayed on the information display unit 5, for example, confidential image data, to the read other image data that is not confidential, and displaying the rewritten image data. The other image data that is not confidential can be, for example, image data that does not contain confidential information, and conceals contents of the displayed image data, such as an entirely black screen, and any image data that does not include confidential information can be used.

Moreover, when receiving an operation to turn off the power of the electronic paper with the power SW 1, the display control unit 102 performs control of reading another image data that is not confidential from the memory unit 16, then rewriting image data displayed on the information display unit 5, for example, confidential image data, to the read other image data that is not confidential, and displaying the rewritten image data. Meanwhile, the display control unit 102 saves the previously displayed image data before the rewrite into the memory unit 16.

Furthermore, when user authentication performed by the authentication unit 103 is successful, the display control unit 102 performs control of reading the saved image data in the memory unit 16 from the memory unit 16, and displaying the read image data onto the information display unit 5. By contrast, when the user authentication performed by the authentication unit 103 is not successful, the display control unit 102 performs control of not-displaying the saved image data in the memory unit 16 onto the information display unit 5.

The authentication unit 103 performs user authentication to a user at power-on, or upon determining with the determination unit 101 that the user touches the electric-power supply unit 11 while some non-confidential image data is being displayed on the information display unit 5. Specifically, when the user touches the electric-power supply unit 11, the identifying unit 18 provided in the electric-power supply unit 11 acquires identification information about the user, and then the authentication unit 103 performs user authentication by comparing the acquired identification information with identification information registered in advance on a recording medium, such as a memory, and determining whether there is a match.

The electric-power supply unit 11 converts thermal energy generated from a body temperature of the user into electric power through contact with the user via each of the switches, and supplies the converted electric power to the display control unit 102 and other units.

Processing to be performed by the electronic paper is explained below. First of all, processing of displaying image data to be performed by the electronic paper according to the first embodiment is explained below with reference to FIG. 5.

Figure 5:
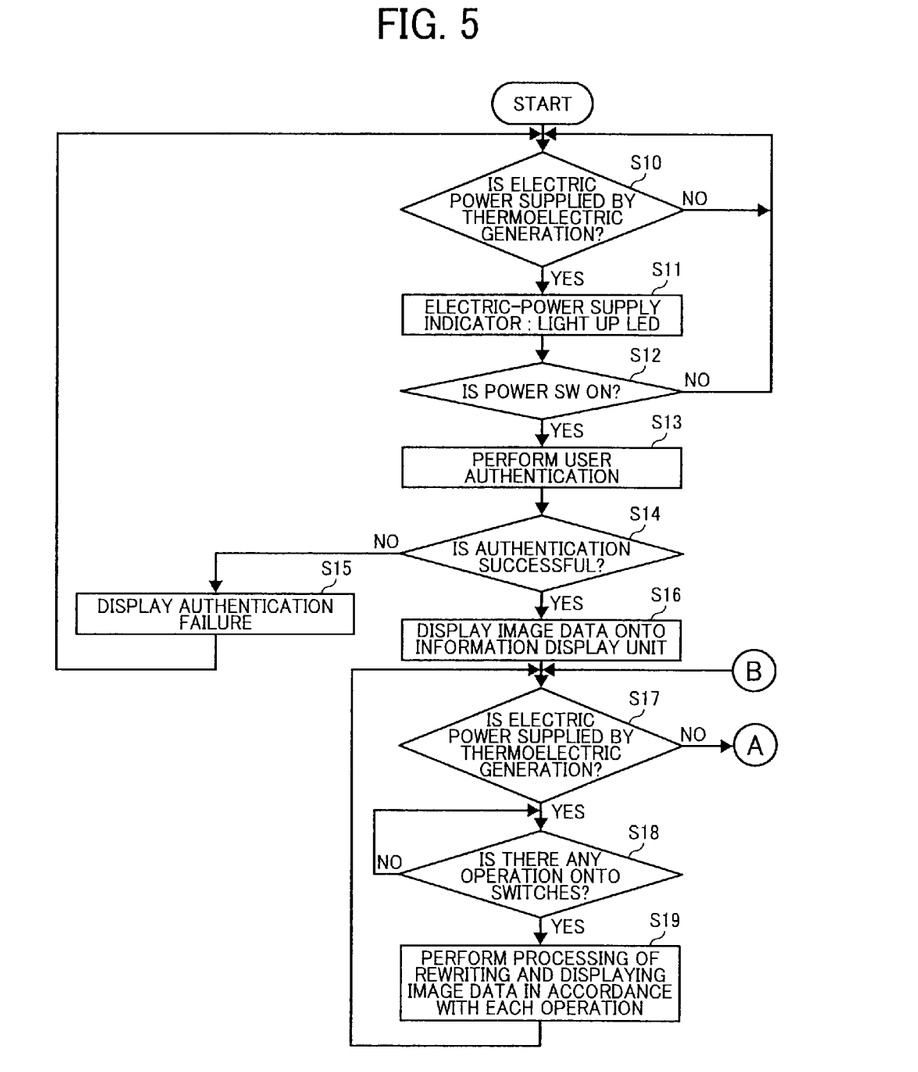
FIG. 5 is a flowchart of a procedure of processing of rewriting and displaying image data performed by the electronic paper shown in FIG. 1.

To begin with, the control unit 100 determines whether the electric-power supply unit 11 supplies electric power to the control unit 100 by thermoelectric generation of converting body heat of the user into electric power (Step S10). If the control unit 100 is not supplied with electric power (No at Step S10), the control unit 100 waits until electric power is supplied. By contrast, if the control unit 100 is supplied with electric power (Yes at Step S10), the control unit 100 indicates that electric power is supplied, by lighting the LED (Step S11).

The control unit 100 then determines whether the user presses the power SW 1 and the power of the electronic paper is turned on (Step S12). If the power is not turned on (No at Step S12), the process control goes back to Step S10 and repeats the processing. By contrast, if the power is turned on (Yes at Step S12), the authentication unit 103 performs user authentication (Step S13).

The display control unit 102 then determines whether the user authentication performed by the authentication unit 103 is successful (Step S14). If the user authentication is not successful, precisely, it is failed (No at Step S14), the display control unit 102 displays an unauthorized status of the user on the information display unit 5 (Step S15), and the process control goes back to Step S10 and repeats the processing.

By contrast, if the user authentication is successful (Yes at Step S14), the display control unit 102 reads image data saved in the memory unit 16, and displays the read image data onto the information display unit 5 (Step S16).

The control unit 100 then determines whether the electric-power supply unit 11 supplies electric power to the control unit 100 by thermoelectric generation (Step S17). If electric power is not supplied (No at Step S17), processing A is performed. The processing A will be described later with reference to FIG. 6.

By contrast, if electric power is supplied (Yes at Step S17), the control unit 100 determines whether an operation to any of the switches is performed by being pressed by the user (Step S18). If no operation to the switches is performed (No at Step S18), the control unit 100 waits until an operation is performed.

By contrast, if an operation onto any of the switches is performed (Yes at Step S18), the display control unit 102 performs processing of rewriting image data appropriate to the operation (Step S19). After the processing of rewriting the image data is finished, the process control goes back to Step S17 and repeats the processing.

Figure 6:
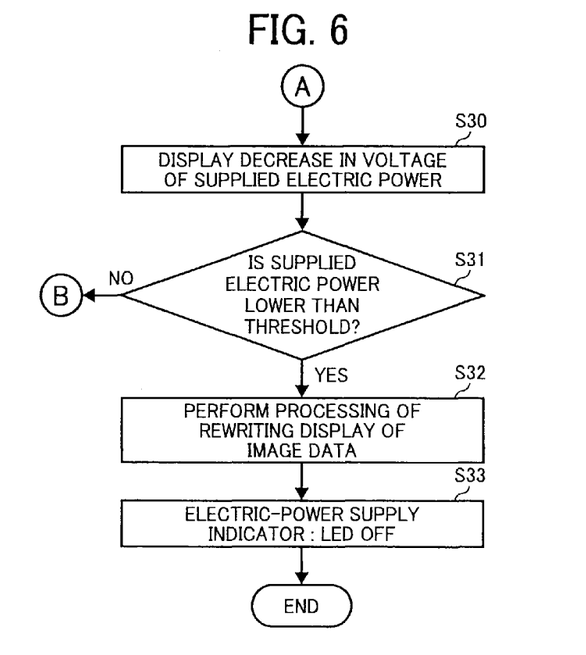
FIG. 6 is a flowchart of a procedure of the processing of rewriting and displaying image data performed by the electronic paper shown in FIG. 1.

Then, processing of rewriting and displaying image data when electric power supply is decreased to be performed by the electronic paper according to the first embodiment is explained below with reference to FIG. 6.

To begin with, if electric power is not supplied at Step S17 (No at Step S17), the display control unit 102 displays on the information display unit 5 that the voltage of supplied electric power is decreased (Step S30). The determination unit 101 then determines whether the electric power supplied to the control unit 100 is lower than a threshold (Step S31). If the electric power supplied to the control unit 100 is not lower than the threshold (No at Step S31), the determination unit 101 determines that a finger or another part of the user is in contact with the electronic paper, for example, the user is holding the electronic paper, the process control goes to processing B, goes back to Step S17 in FIG. 5, and continues the processing.

By contrast, if the electric power supplied to the control unit 100 is lower than the threshold (Yes at Step S31), the determination unit 101 determines that any finger or any other part of the user is not in contact with the electronic paper, for example, the user is leaving the electronic paper alone. The display control unit 102 then reads another image data that is not confidential from the memory unit 16, and rewrites displayed image data on the information display unit 5, for example, confidential image data, to the read other image data that is not confidential (Step S32). Accordingly, if the displayed image data when the electronic paper is left alone by the user is confidential image data, the electronic paper can ensure the confidentiality of the image data.

The control unit 100 then indicates that electric power is not supplied by lighting out the LED (Step S33).

Figure 7:
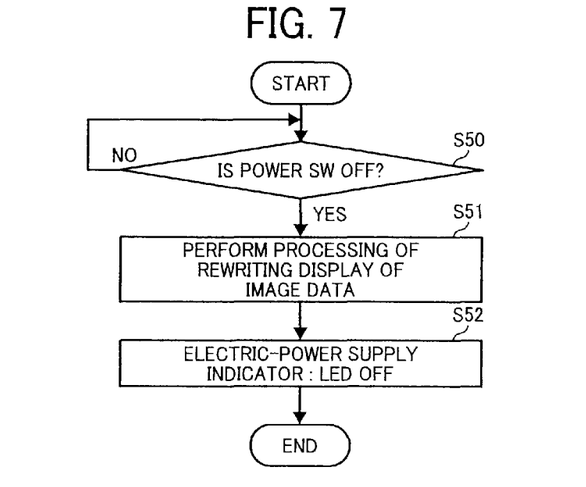
FIG. 7 is a flowchart of a procedure of processing of rewriting and displaying image data performed by the electronic paper shown in FIG. 1.

Then, processing of rewriting and displaying image data when the power is turned off to be performed by the electronic paper according to the first embodiment is explained below with reference to FIG. 7.

To begin with, the control unit 100 determines whether the user presses the power SW 1 and the power of the electronic paper is turned off (Step S50). If the power is not turned off (No at Step S50), the process control goes back to Step S50, and repeats the processing.

By contrast, if the power is turned off (Yes at Step S50), the display control unit 102 reads another image data that is not confidential from the memory unit 16, and rewrites image data displayed on the information display unit 5, for example, confidential image data, to the read other image data that is not confidential (Step S51). Accordingly, if confidential image data is displayed when the power is turned off, the display state of the image data is not retained, so that the electronic paper can ensure the confidentiality of the image data.

The control unit 100 then indicates that electric power is not supplied by lighting out the LED (Step S52).

In this way, the electronic paper according to the first embodiment displays image data, for example, confidential image data, if user authentication performed at power-on is successful. When electric power supplied from the electric-power supply unit 11 is lower than a threshold, or when the power is turned off, the electronic paper rewrites displayed image data to another image data that is not confidential and displays the rewritten image data. Thus, when the electronic paper is left alone, or when the power is turned off, confidential information is not disclosed, so that leakage of the confidential information can be prevented.

Moreover, according to the first embodiment, while a user is holding the electronic paper and performing various operations, the electric-power supply unit 11 performs thermoelectric generation of converting body heat of the user into electric power, and supplies the converted electric power to the control unit 100, and then various processing are performed. Accordingly, electric power can be supplied without installing a battery or connecting to an external power source, and additional work, such as charging a battery, is not needed, consequently, the electronic paper can be small in size and light in weight, thereby improving its portability and convenience.

The electronic paper according to the first embodiment performs processing of rewriting image data, when supplied electric power is lower than a threshold, or when the power is turned off, however, the electronic paper can also perform the processing of rewriting in a case as described below.

Figure 8:
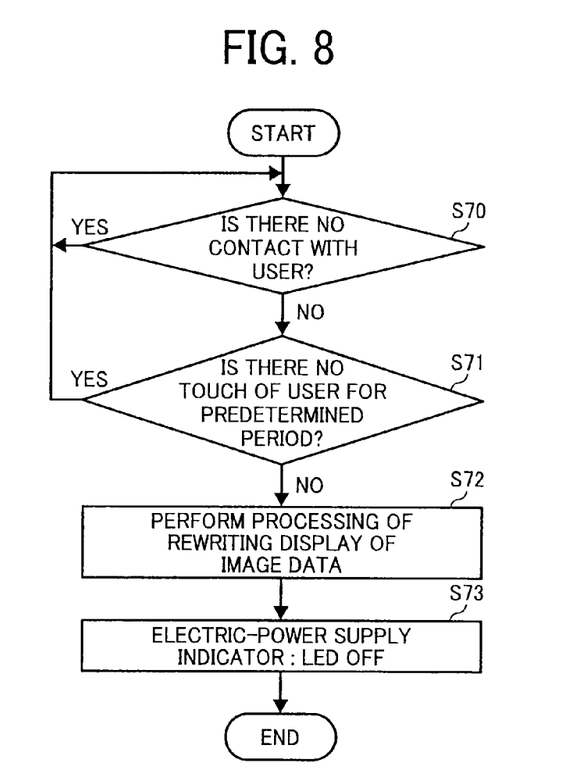
FIG. 8 is a flowchart of a procedure of processing of rewriting and displaying image data performed by electronic paper according to a modification of the first embodiment.

The electronic paper according to a modification of the first embodiment includes a sensor that detects a touch of a user on the electric-power supply unit 11 via any of the switches, for example, a piezoelectric sensor. The electronic paper can be configured such that if the sensor detects no touch of the user for a predetermined period, the determination unit 101 determines that the user is not in contact with the electric-power supply unit 11, by contrast, if the sensor detects contact with the user, the determination unit 101 determines that the user holds the electronic paper, and is in contact with the electric-power supply unit 11. The electronic paper can be configured to perform the processing of rewriting image data when the user is not in contact with the electric-power supply unit 11.

Processing of rewriting and displaying image data to be performed by the electronic paper according to the modification that is provided with a sensor is explained below with reference to FIG. 8.

To begin with, the determination unit 101 determines whether the user is in contact with the electric-power supply unit 11 (Step S70). If the user is in contact with the electric-power supply unit 11, i.e., if the sensor detects contact with the user (Yes at Step S70), the process control goes back to Step S70 and repeats the processing.

By contrast, if the user is not in contact with the electric-power supply unit 11, i.e., the sensor detects no touch of the user (No at Step S70), the determination unit 101 determines whether there is a touch of the user within a predetermined period (Step S71). If there is a touch of the user within the predetermined period (Yes at Step S71), the process control goes back to Step S70 and repeats the processing.

By contrast, if there is no touch of the user for a longer time than the predetermined period (No at Step S71), the display control unit 102 reads another image data that is not confidential from the memory unit 16, and rewrites displayed image data on the information display unit 5, for example, confidential image data, to the read other image data that is not confidential (Step S72). Accordingly, if confidential image data is displayed when it is determined that the user is not in contact with the electric-power supply unit 11 by using the sensor, the display state of the image data is not retained, so that the electronic paper can ensure the confidentiality of the image data.

The control unit 100 then indicates that electric power is not supplied by lighting out the LED (Step S73).

In this way, when the user is not in contact with the electric-power supply unit 11, the electronic paper according to the modification rewrites displayed image data, for example, confidential image data, to another image data that is not confidential, and displays the rewritten image data. Thus, when the user is not in contact with the electric-power supply unit 11 for a predetermined period, for example, when the electronic paper is left alone, confidential information is not disclosed, so that leakage of the confidential information can be prevented. The predetermined period can be set to any period desired by the user, so that convenience of the electronic paper is further improved.

The electronic paper according to the first embodiment performs processing of displaying image data by using electric power converted and supplied by the electric-power supply unit 11. According to a second embodiment of the present invention, electronic paper is configured to store therein electric power converted by the electric-power supply unit 11, and to perform processing of displaying image data by using either electric power supplied from the electric-power supply unit 11 or the stored electric power, depending on a situation.

When the electronic paper displays thereon image data, it is concerned that as the number of pieces of image data to be displayed increases, operating power for performing display control increases. Therefore, to improve performance of continuous operations and response, as the electronic paper according to the second embodiment includes a charging unit charges the electric power generated by thermoelectric generation, the electronic paper can gain a large amount of electric power.

Because operations performed by the user to the electronic paper are mainly the operation of rewriting image data, electric power is not required for most of the time. Consequently, while electric power is not used for most of the time, generated electric power is not consumed.

By being charged in the charging unit, the electric power that is converted by the electric-power supply unit 11 while electric power is not required, electric power can be supplied readily in response to continuous control that requires a large amount of electric power.

Figure 9:
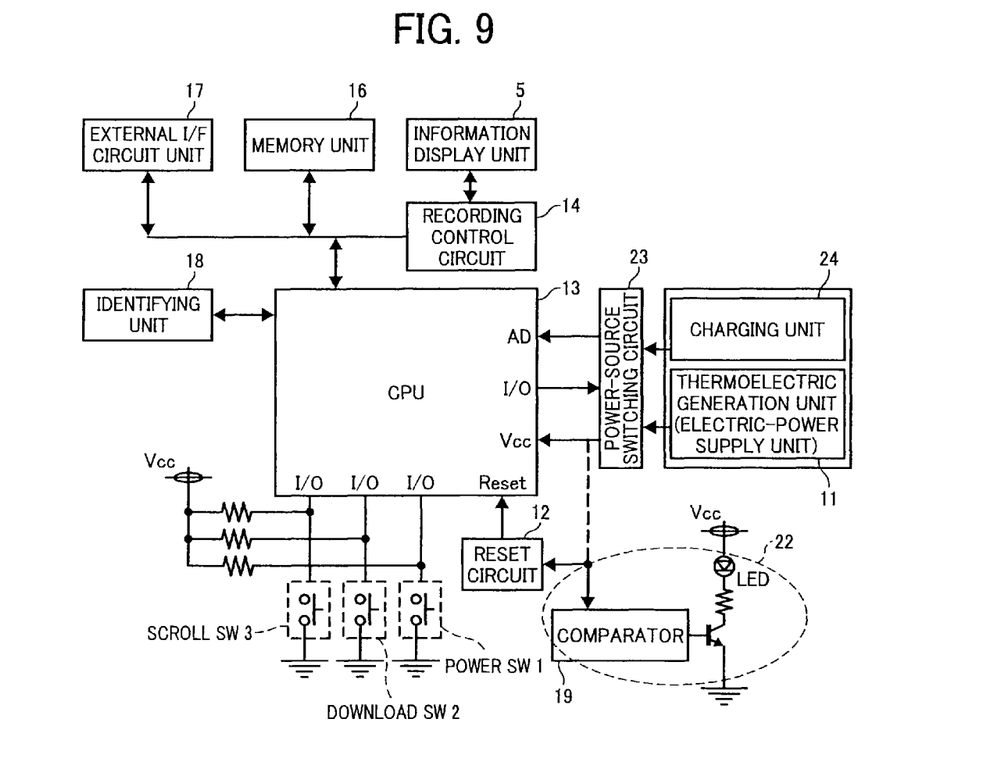
FIG. 9 is a schematic diagram of an example of a hardware configuration of electronic paper according to a second embodiment of the present invention.

FIG. 9 is a schematic diagram of an example of a configuration of the electronic paper according to the second embodiment. The other units than a power-source switching circuit 23 connected to the CPU 13 and a charging unit 24 connected to the power-source switching circuit 23 shown in FIG. 9 are similar to those in the first embodiment, therefore, explanations of them are omitted.

The charging unit 24 charges the electric power converted by the electric-power supply unit 11, and, for example, a capacitor can be used as the charging unit 24. Because rewriting of image data requires electric power temporarily, a device that has a low capacitance and a small size and does not contain toxic substance, such as a capacitor, can be suitable.

The electric-power supply unit 11 and the charging unit 24 are connected to each other via the power-source switching circuit 23.

The power-source switching circuit 23 compares a voltage of electric power converted by the electric-power supply unit 11 with a voltage of electric power charged in the charging unit 24, and supplies electric power from one the two sources, of which voltage is higher than the other, to the CPU 13.

When the voltage of the charging unit 24 is lower than the voltage of electric power in the electric-power supply unit 11, a charging control operation from the electric-power supply unit 11 to the charging unit 24 is performed.

In other words, as the electronic paper includes the power-source switching circuit 23 and the charging unit 24 that charges the electric power generated from the thermoelectric device 6, electric power generated by the user through thermoelectric generation can be stored in the charging unit 24, when the electronic paper does not require electric power for operation.

When performing operational control of processing of massive image data that requires a large amount of electric power, the electric power charged in the charging unit 24 and the electric power from the electric-power supply unit 11 can be supplied together.

When the user continuously operates at least one of the switches, the power-source switching circuit 23 supplies electric power to the control unit 100 from both the electric-power supply unit 11 and the charging unit 24.

The information display program to be executed by the electronic paper according to the first and second embodiments can be provided by being incorporated in a ROM or another device in advance.

Moreover, the information display program can be configured to be provided as a file of an installable format or an executable format recorded onto a computer-readable recording medium, such as a compact disk read only memory (CD-ROM), a flexible disk (FD), a compact disk recordable (CD-R), or a digital versatile disk (DVD).

Furthermore, the information display program can be configured to be stored in a computer connected to a network, such as the Internet, and provided by downloading via the network. Alternatively, the information display program can be configured to be provided or distributed via a network, such as the Internet.

The information display program has a module configuration that includes the above described units, namely, the determination unit 101, the display control unit 102, and the authentication unit 103, each of which is configured to be loaded and implemented on a main memory by reading the information display program from the ROM and executing it by the CPU 13 as actual hardware.

As described above, according to an aspect of the present invention, the information display apparatus includes the electric-power supply unit that converts thermal energy generated from a body temperature of a user into electric power, and when the user is not in contact with the electric-power supply unit, the information display apparatus rewrites displayed image information to another image information that is not confidential, and then displays thereon the rewritten image information, thereby preventing confidential information displayed thereon from leaking out, and improving its portability and convenience.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic paper display apparatus comprising:
   an electronic paper display unit configured to display thereon first image information including confidential information;
   a storage unit configured to store therein the first image information and a second image information consisting of non-confidential information;
   a display control unit configured to perform a control of writing and rewriting the first image information on the electronic paper display unit;
   an electric-power supply unit configured to supply electric power to the display control unit; and
   a determination unit configured to determine whether or not the electric power to the display control unit is lower than a threshold, wherein
   when the determination unit determines that the electric power to the display control unit is lower than the threshold, the display control unit saves the first information on the electronic paper display unit into the storage unit, and rewrites the first image information on the electronic paper display unit to the second image information consisting of non-confidential information;
   the electronic paper display apparatus further comprising:
   a thermoelectric generation unit that does not include a battery, and converts thermal energy provided from a body temperature of a user into electric power upon the user contacting the thermoelectric generation unit, and supplies the electric power to the display control unit as operating power of the display control unit, and
   wherein the determination unit determines whether the user is in contact with the thermoelectric generation unit, and when the determination unit determines that the user is not in contact with the thermoelectric generation unit, the display control unit performs a control of rewriting the first image information displayed on the electronic paper display unit with second image information.

2. The electronic paper display apparatus according to claim 1, wherein when a voltage of the electric power generated by the thermoelectric generation unit is lower than a threshold, the determination unit determines that the user is not in contact with the thermoelectric generation unit.

3. The information display apparatus according to claim 1, further comprising:
   a detecting unit that detects a touch of the user on the thermoelectric generation unit,
   wherein when the detecting unit detects no touch of the user for a predetermined time, the determination unit determines that the user is not in contact with the thermoelectric generation unit.

4. The information display apparatus according to claim 1, further comprising:
   a first operation unit that receives an operation of a power source of the information display apparatus from the user,
   wherein when the first operation unit receives an operation of turning-off the power source of the information display apparatus, the display control unit the control of rewriting the first image information displayed on the electronic paper display unit with the second image information.

5. The information display apparatus according to claim 1, further comprising:
   a transit unit that selects the control of rewriting the first image information displayed on the electronic paper display unit with the second image information when the determination unit determines that the user is not in contact with the thermoelectric generation unit,
   wherein when the transit unit does not select the control of rewriting the first image information displayed on the electronic paper display unit with the second image information, the display control unit does not perform the control of rewriting the first image information with the second image information even when the determination unit determines that the user is not in contact with the thermoelectric generation unit.

6. The information display apparatus according to claim 1, further comprising:
   an authentication unit that performs a user authentication of the user when the determination unit determines that the user is in contact with the thermoelectric generation unit while the second image information is displayed on the electronic paper display unit,
   wherein when the authentication unit performs the user authentication successfully, the display control unit performs the control of displaying the first image information on the electronic paper display unit.

7. The information display apparatus according to claim 6, wherein when the authentication unit does not perform the user authentication successfully, the display control unit does not perform the control of displaying the first image information on the electronic paper display unit.

8. The information display apparatus according to claim 6, further comprising:
   an identifying unit that is provided on a touchable portion by the user and that acquires identification information of the user,
   wherein the authentication unit performs the user authentication by comparing the identification information acquired by the identifying unit with registered identification information.

9. The information display apparatus according to claim 1, wherein the thermoelectric generation unit includes
   a thermoelectric device that includes a number of thermocouples;
   a thermal conductor that conducts the body temperature of the user to the thermoelectric device from a hot junction; and
   a heat sink that conducts a temperature close to an ambient temperature to the thermoelectric device from a cold junction, and
   the thermoelectric device converts thermal energy generated by a difference in temperatures conducted from the thermal conductor and the heat sink into electric power, and supplies the electric power to the display control unit.

10. The information display apparatus according to claim 9, further comprising:
    a first operation unit that receives an operation of a power source of the information display apparatus from the user;
    a second operation unit that receives an operation of acquiring the first image information from an external device; and a third operation unit that receives an instruction to rewrite the first image information displayed on the electronic paper display unit, wherein
the first operation unit, the second operation unit, and the third operation unit are arranged to be superposed on a position at which the thermal conductor is arranged, and
the thermal conductor conducts the body temperature of the user from the hot junction to the thermoelectric device through a contact with the user via at least one of the first operation unit, the second operation unit, and the third operation unit.

11. The information display apparatus according to claim 1, further comprising:
a charging unit that charges electric power generated by the thermoelectric generation unit; and
a power-source switching unit that switches a supply of the electric power to the display control unit between the charging unit and the thermoelectric generation unit,
wherein the power-source switching unit compares voltages of the charging unit and the electric power generated by the thermoelectric generation unit, and supplies the electric power to the display control unit from either one of the charging unit and the thermoelectric generation unit which has a higher voltage.

12. A method of displaying information executed in an electronic paper display apparatus, the method comprising:
displaying, by an electronic paper display unit, first image information including confidential information;
storing, at a storage unit, the first image information and a second image information consisting of non-confidential information;
controlling, by a display control unit, writing and rewriting the first image information on the electronic paper display unit;
supplying, by an electric-power supply unit, electric power to the display control unit; and
determining, by a determination unit, whether or not the electric power to the display control unit is lower than a threshold, wherein
when the determination unit determines that the electric power to the display control unit is lower than the threshold, the display control unit saves the first information on the electronic paper display unit into the storage unit, and rewrites the first image information on the electronic paper display unit to the second image information consisting of non-confidential information;
wherein the electronic paper display apparatus includes a thermoelectric generation unit that does not include a battery, and the method further comprises converting thermal energy provided from a body temperature of a user into electric power upon the user contacting the thermoelectric generation unit, and supplying the electric power to the display control unit as operating power of the display control unit, and
wherein the method further includes determining, by the determination unit, whether the user is in contact with the thermoelectric generation unit, and when the determination unit determines that the user is not in contact with the thermoelectric generation unit, the display control unit performs a control of rewriting the first image information displayed on the electronic paper display unit with second image information.

13. A non-transitory computer readable storage medium having stored thereon a computer program having computer-readable program codes that when executed by an electronic paper display apparatus causes the electronic paper display apparatus to perform a method comprising:
displaying, by an electronic paper display unit, first image information including confidential information;
storing, at a storage unit, the first image information and a second image information consisting of non-confidential information;
controlling, by a display control unit, writing and rewriting the first image information on the electronic paper display unit;
supplying, by an electric-power supply unit, electric power to the display control unit; and
determining, by a determination unit, whether or not the electric power to the display control unit is lower than a threshold, wherein
when the determination unit determines that the electric power to the display control unit is lower than the threshold, the display control unit saves the first information on the electronic paper display unit into the storage unit, and rewrites the first image information on the electronic paper display unit to the second image information consisting of non-confidential information,
wherein the electronic paper display apparatus includes a thermoelectric generation unit that does not include a battery, and the method further comprises converting thermal energy provided from a body temperature of a user into electric power upon the user contacting the thermoelectric generation unit, and supplying the electric power to the display control unit as operating power of the display control unit, and
wherein the method further includes determining, by the determination unit, whether the user is in contact with the thermoelectric generation unit, and when the determination unit determines that the user is not in contact with the thermoelectric generation unit, the display control unit performs a control of rewriting the first image information displayed on the electronic paper display unit with second image information.

* * * * *